(12) United States Patent
Qian et al.

(10) Patent No.: US 10,047,875 B2
(45) Date of Patent: Aug. 14, 2018

(54) INTERMEDIATE BULK CONTAINER AND VALVE OPENING/CLOSING DEVICE THEREFOR

(71) Applicant: SHANGHAI HONGYAN RETURNABLE TRANSIT PACKAGINGS CO., LTD, Shanghai (CN)

(72) Inventors: Zuocheng Qian, Shanghai (CN); Kai Gong, Shanghai (CN); Zhengwei Fang, Shanghai (CN)

(73) Assignee: SHANGHAI HONGYAN RETURNABLE TRANSIT PACKAGINGS CO., LTD., Shanghai (CN)

( * ) Notice: Subject to any disclaimer, the term of this patent is extended or adjusted under 35 U.S.C. 154(b) by 433 days.

(21) Appl. No.: 14/422,118

(22) PCT Filed: Aug. 16, 2013

(86) PCT No.: PCT/CN2013/081633
§ 371 (c)(1),
(2) Date: May 5, 2015

(87) PCT Pub. No.: WO2014/026638
PCT Pub. Date: Feb. 20, 2014

(65) Prior Publication Data
US 2016/0123493 A1    May 5, 2016

(30) Foreign Application Priority Data

Aug. 16, 2012   (CN) .......................... 2012 1 0292808

(51) Int. Cl.
*F16K 31/46* (2006.01)
*F16K 31/60* (2006.01)
(Continued)

(52) U.S. Cl.
CPC .............. *F16K 31/46* (2013.01); *B65D 19/02* (2013.01); *B65D 19/06* (2013.01); *B65D 77/061* (2013.01);
(Continued)

(58) Field of Classification Search
CPC ......... F16K 31/46; F16K 31/60; B65D 19/02; B65D 19/06; B65D 77/061; B65D 2519/00338; B65D 2519/00805
(Continued)

(56) References Cited

U.S. PATENT DOCUMENTS

| | | | | |
|---|---|---|---|---|
| 435,188 | A | * | 8/1890 | Puffer .................. B67D 3/0029 222/185.1 |
| 578,767 | A | * | 3/1897 | Omerod ............. B65D 81/3222 222/129 |

(Continued)

FOREIGN PATENT DOCUMENTS

| | | |
|---|---|---|
| CN | 201276237 | 7/2009 |
| CN | 201276237 Y | 7/2009 |

(Continued)

OTHER PUBLICATIONS

International search report for application No. PCT/CN2013/081633, dated Nov. 7, 2013 (8 pages).
(Continued)

*Primary Examiner* — Nicholas J Weiss
*Assistant Examiner* — Andrew P Bainbridge
(74) *Attorney, Agent, or Firm* — Hamre, Schumann, Mueller & Larson, P.C.

(57) ABSTRACT

The present invention discloses an intermediate bulk container (IBC) and a valve opening/closing device therefor. The container comprises a base, side plates, and a valve installed at the bottom of the container. The valve opening/closing device comprises a handle, a motion-transferring
(Continued)

device and a valve opening/closing mechanism. The handle is installed at the side plate and is connected with the motion-transferring device. The motion-transferring device is at least partially located in the cavity between two sidewalls of the side plate of the container or at least partially located in the groove provided on the side plate, and is used to transfer the actions acting on the handle to the valve opening/closing mechanism to open/close the valve. According to the valve opening/closing device of the present invention, the operating handle is provided at an appropriate position of the side plate of the container, and the motion-transferring device is located between two sidewalls of the side plate or located in the groove provided on the side plate, thereby avoiding bending over or squatting on the ground while opening/closing. Further, the overall volume ratio will not be affected, and the folding level will not be increased when the folding the intermediate bulk container.

13 Claims, 11 Drawing Sheets

(51) Int. Cl.
  B65D 19/06 (2006.01)
  B65D 77/06 (2006.01)
  B65D 19/02 (2006.01)
(52) U.S. Cl.
  CPC .... *F16K 31/60* (2013.01); *B65D 2519/00338* (2013.01); *B65D 2519/00805* (2013.01)
(58) Field of Classification Search
  USPC .............. 222/510, 185.1, 184, 94, 105–107, 222/591–607; 81/177.15
  See application file for complete search history.

(56) References Cited

U.S. PATENT DOCUMENTS

| | | | | |
|---|---|---|---|---|
| 584,900 A * | 6/1897 | Scott | ............... | B67C 11/04 141/344 |
| 670,792 A * | 3/1901 | Lippincott | ............ | F25D 23/126 222/160 |
| 847,458 A * | 3/1907 | Beham | ................. | F25D 3/08 206/265 |
| 863,180 A * | 8/1907 | Howard | .............. | F16K 31/0655 251/129.11 |
| 1,361,130 A * | 12/1920 | York | ................. | B25B 13/06 81/177.75 |
| 1,612,713 A * | 12/1926 | Fienberg | ................ | B25B 13/44 74/545 |
| 1,953,200 A * | 4/1934 | Thomas | .................. | F16N 3/04 222/470 |
| 2,517,301 A * | 8/1950 | Gottlieb | .............. | B67D 1/0082 222/129.1 |
| 2,550,608 A * | 4/1951 | Shotwell | .............. | B61C 15/105 222/509 |
| 2,887,251 A * | 5/1959 | Mackridge | ............... | B65D 7/22 220/1.5 |
| 4,339,110 A * | 7/1982 | Ortega | ................. | F16K 5/0478 251/309 |
| 5,093,896 A * | 3/1992 | Moore | ................... | B67D 7/80 126/343.5 A |
| 5,254,167 A * | 10/1993 | Janoski | ................ | B05C 5/0275 118/108 |
| 5,794,818 A * | 8/1998 | Bromwell | ............. | B65D 11/10 220/684 |
| 5,897,012 A * | 4/1999 | Sortwell | ............... | B65D 19/12 206/600 |
| 5,947,346 A * | 9/1999 | London | .................. | E04D 15/07 222/565 |
| 5,957,338 A * | 9/1999 | Lehmann | ............... | B65D 88/60 222/184 |
| 6,003,705 A * | 12/1999 | Burguieres, Jr. | ..... | B65D 88/128 220/1.5 |
| 6,045,013 A * | 4/2000 | Yang | .................. | B65D 25/2894 137/347 |
| 6,125,868 A * | 10/2000 | Murphy | .................. | F16K 31/46 137/1 |
| 6,854,710 B2 * | 2/2005 | Gosis | .................... | F16K 5/0478 251/305 |
| 7,987,635 B2 * | 8/2011 | Thielke | ................. | E04H 1/1266 49/382 |
| 8,231,030 B2 * | 7/2012 | Lassota | ................ | B67D 3/0061 222/1 |
| 8,413,957 B2 * | 4/2013 | Fandel | ................. | F16K 31/465 137/315.38 |
| 2002/0109119 A1* | 8/2002 | Stolzman | .............. | F16K 5/0442 251/309 |
| 2005/0218366 A1* | 10/2005 | Chick | .................... | F16K 31/46 251/293 |
| 2009/0277900 A1* | 11/2009 | Howison | ............ | B65D 90/0033 220/1.6 |
| 2009/0294486 A1 | 12/2009 | McKnight et al. | | |
| 2013/0126562 A1* | 5/2013 | Feldmeier | ................ | B62B 3/10 222/608 |
| 2013/0279981 A1* | 10/2013 | Rogan | .................... | E01C 19/16 404/101 |

FOREIGN PATENT DOCUMENTS

| | | |
|---|---|---|
| CN | 102808989 A | 12/2012 |
| CN | 102808990 A | 12/2012 |
| CN | 102840381 A | 12/2012 |
| CN | 202852157 U | 4/2013 |
| CN | 202992355 | 6/2013 |
| CN | 202992355 U | 6/2013 |
| CN | 203099049 U | 7/2013 |
| WO | 9008707 | 8/1990 |
| WO | WO 90/08707 | 8/1990 |

OTHER PUBLICATIONS

Extended European Search Report for European application No. 13829940.9, dated Apr. 11, 2016 (7 pages).

* cited by examiner

INTERMEDIATE BULK CONTAINER AND VALVE OPENING/CLOSING DEVICE THEREFOR

FIELD

The present invention relates to containers, in particular to valve opening/closing devices used in intermediate bulk containers.

BACKGROUND

The valve opening/closing device of an existing intermediate bulk container is typically provided at the valve base, thus a user must bend over or squat on the ground to operate when opening or closing the valve, which is very inconvenient. US publication No. 20030102309A discloses some similar containers provided with a valve, wherein the valve opening/closing device is located on the valve. When opening/closing the valve, the operator has to bend over or squat on the ground in order to operate, which is inconvenient for use.

SUMMARY

The object of the present invention is to provide a valve opening/closing device that is convenient for opening/closing the valve, and an operator does not need to bend over or squat on the ground when opening or closing the valve.

To achieve the object described above, the present invention provides a valve opening/closing device used for intermediate bulk containers (IBC), the container comprises a base, side plates, and a valve installed at the bottom of the container, wherein the valve opening/closing device comprises a handle, a motion-transferring device, a valve opening/closing mechanism. The handle is installed on the side plate of the container and is connected to the motion-transferring device. The motion-transferring device is at least partially located in a cavity between two sidewalls of the side plate of the container or at least partially located in the groove provided on the side plate, so that forces applied on the handle can be transferred to the valve opening/closing mechanism through the motion-transferring device, so as to achieve the opening/closing of the valve even if the central rotating axis of the handle and the central rotating axis of the valve opening/closing mechanism are not in a same line.

In a preferred embodiment, the motion-transferring device may comprises a connecting tube connected to the handle, a middle connecting section connected to the connecting tube, and a lower connecting section connected to the middle connection section. The lower connecting section may be provided with the valve opening/closing mechanism. The connecting tube, the middle connecting section and the lower connecting section constitute a universal mechanism, so that forces applied on the handle may be transferred through the connecting tube and the lower connecting section so as to open or close the valve even if the central rotating axis of the handle and the central rotating center of the valve opening/closing mechanism are not in a same line.

In the embodiment described above, preferably, the valve opening/closing mechanism is a "—"-shaped or "┼"-shaped connecting head on the lower connecting section.

In the embodiment described above, preferably, the valve opening/closing device may further comprises a handle connecting member, wherein one end of the handle connecting member is provided with a spline, and the other end of the handle connecting member is provided with a rotation-stopping projection and elastic buttons. The handle is provided with a spline slot to be engaged with the spline. Both ends of the connecting tube are provided with rotation-stopping slots and positioning holes.

In the embodiment described above, preferably, the valve opening/closing device further comprises an upper connecting section, wherein one end of the upper connecting section is provided with elastic buttons and rotation-stopping projection, the other end of the upper connecting section is provided with connecting lugs, wherein the connecting lugs are provided with connecting holes. The elastic buttons and rotation-stopping projection are engaged with the positioning holes and the rotation-stopping slots on one end of the connecting tube respectively.

In the embodiment described above, preferably, the valve opening/closing device further comprises a cross member, wherein the cross member is provided with four radially projecting shafts which forms a cross. The middle connecting section is also provided with connecting lugs and connecting holes on the connecting lugs, and the upper connecting section is connected to the middle connecting section through the cross member.

In the embodiment described above, preferably, one end of the lower connecting section is provided with lugs and connecting holes. The middle connecting section is connected to the lower connecting section through another cross member.

In another embodiment of the present invention, the valve opening/closing device further comprises a handle fixing base used to secure the handle and installed on the side plate of the container.

In the embodiment described above, the valve opening/closing device further may further comprise a handle restoring spring, which can be embedded into the handle and installed in the handle fixing base together with the handle.

The present invention also provides a intermediate bulk container (IBC), comprising a base, side plates and a valve installed at the bottom of the container, wherein container further comprises a valve opening/closing device described above.

For the valve opening/closing device according to the present invention, the operating handle is provided at an appropriate position of the side plate of the container, thereby avoiding bending over or squatting on the ground, etc, when opening or closing the valve, facilitating use. Further, the motion-transferring device is installed inside the side plate, thus during the usage of the intermediate bulk container, the overall volume ratio will not be affected, and the folding level will not be increased when the folding the intermediate bulk container. Moreover, the operating handle or lever on the side plate can be made with moment arms of different sizes and different lengths, which makes it easy to control the operating force.

DRAWINGS

DETAILED DESCRIPTIONS

Figure 1:
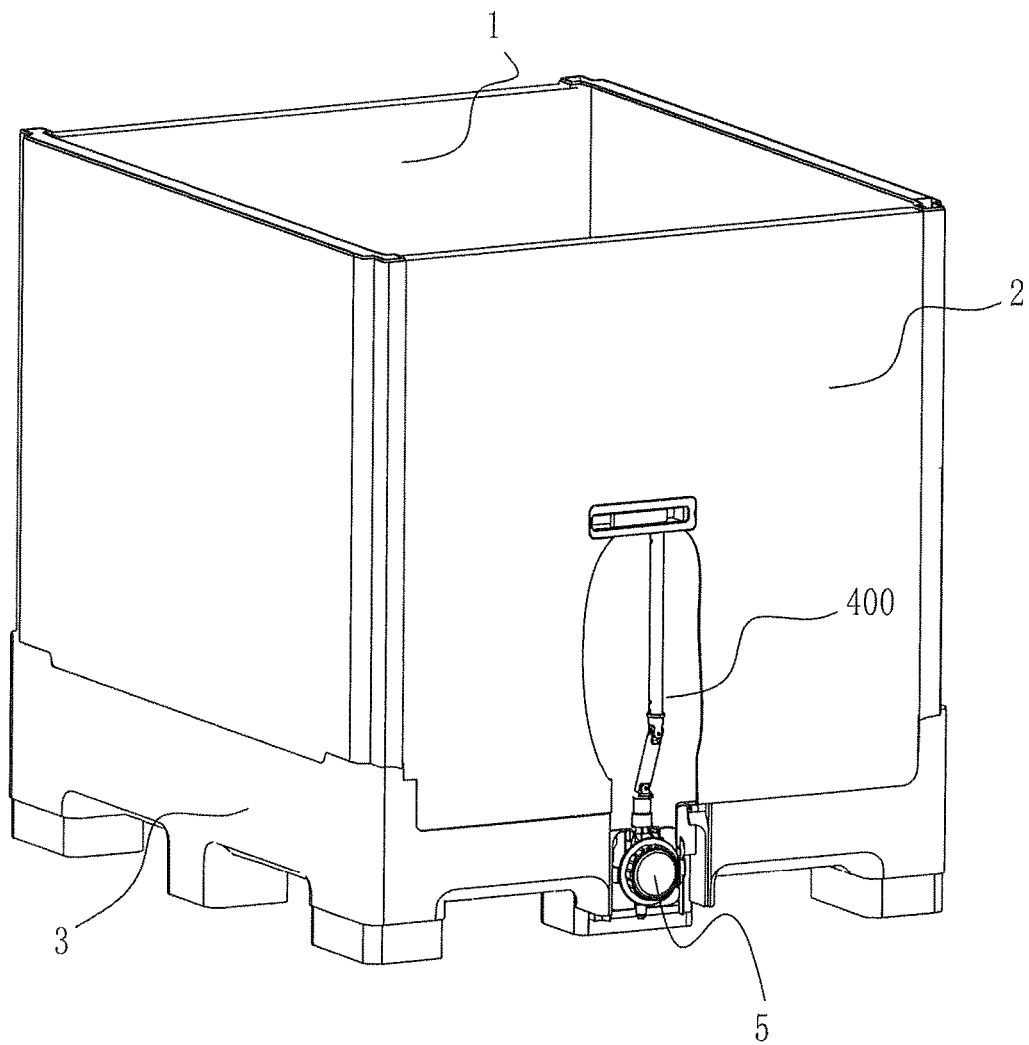
FIG. 1 is a schematic perspective structural view of a intermediate bulk container provided with a valve opening/closing device of the present invention.

Hereinafter, preferred embodiment of the present invention will be described in detail with reference to the drawings, so that the purposes, features and advantages of the present invention will be more clearly understood. It should be understood that the embodiments shown in the drawings are not to limit the scope of the invention, but merely to illustrate the true spirit of the technical solutions of the present invention.

Herein, the intermediate bulk containers (IBC) are packaging containers widely used in food, biochemical, pharmaceutical, chemical and other industries worldwide. IBC can be reused many times and have distinct advantages for filling, storage and transportation. Compared with barrels, IBC containers can save 35% of the storage space, have dimensions conforming to ISO standards, are suitable for aseptic filling and have a compact structure, are convenient for bulk storage with safety and efficiency, and thus widely used in the transportation, packaging, storage process of liquids, granules, flakes and materials of other forms. Currently, there are three main existing specifications, including 820 L, 1000 L and 1250 L. Typically, the IBC comprises a plastic liner, a filling port, a discharge valve, side plates, a base and a cover. Most of liquids or particles stored in IBC are pharmaceutical intermediates, beverage concentrates, food additives and even dangerous materials, etc., which are not only expensive but also related with sanitation and safety. Therefore, protection functions used to prevent the IBC from unauthorized opened or discharged are needed during operation.

FIG. 1 is a partially sectional view of an intermediate bulk container 1 provided with a valve opening/closing device 400 of the present invention. The bulk container 1 typically comprises a side plate 2, a base 3 and a valve 5 provided at the bottom of the container. For existing bulk containers, the valve opening/closing device is typically provided directly on the valve, i.e., at the bottom of the container. The operator must squat on or stoop when opening or closing the valve.

However, as shown in FIG. 1, the intermediate bulk container 1 according to the present invention is provided with a valve opening/closing device 400. The valve opening/closing device 400 includes a handle fixing base 401 and a handle 402 mounted on a side plate 2 of the container 1, a motion-transferring device 700 located inside the side plate or provided on the side plate and a valve opening/closing mechanism. Operations acting on the handle 402 may be transferred to the valve opening/closing mechanism through the motion-transferring device, thereby the operator does not have to squat or stoop in order to open and close the valve 5 located at the bottom of the container.

Figure 2:
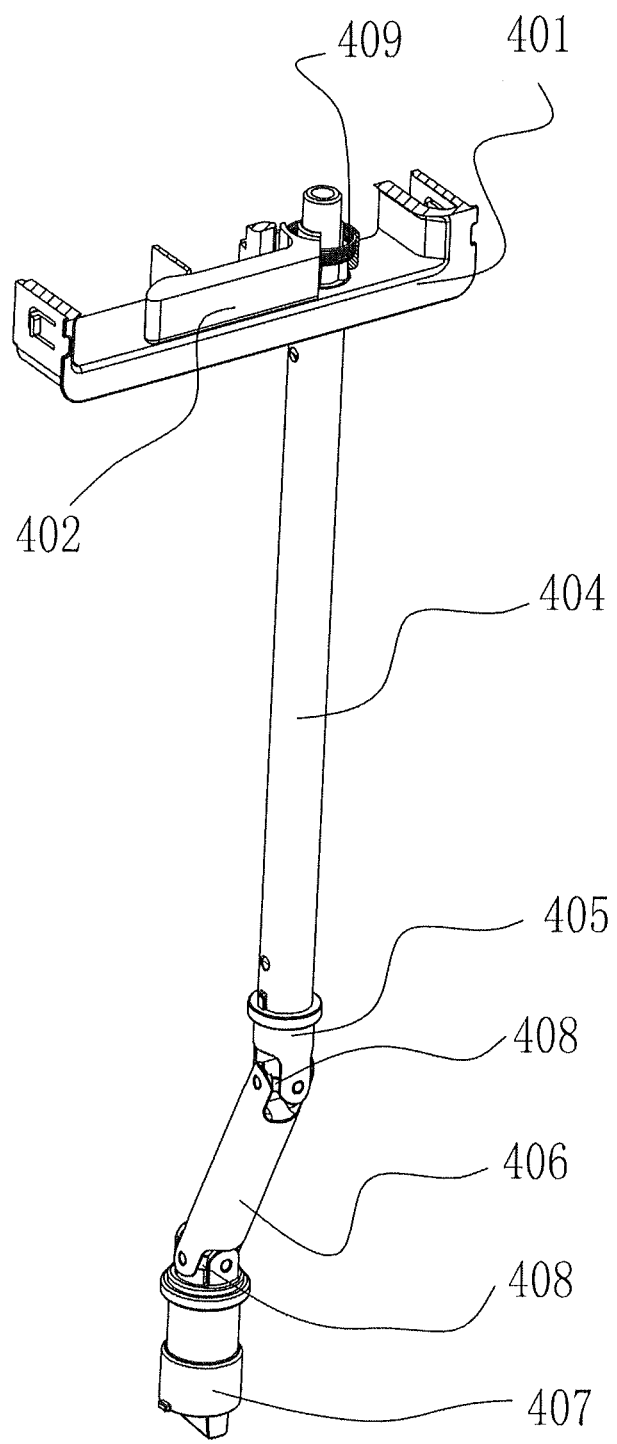
FIG. 2 is a perspective structural view of the valve opening/closing device according to one embodiment of the present invention.
Figure 3:
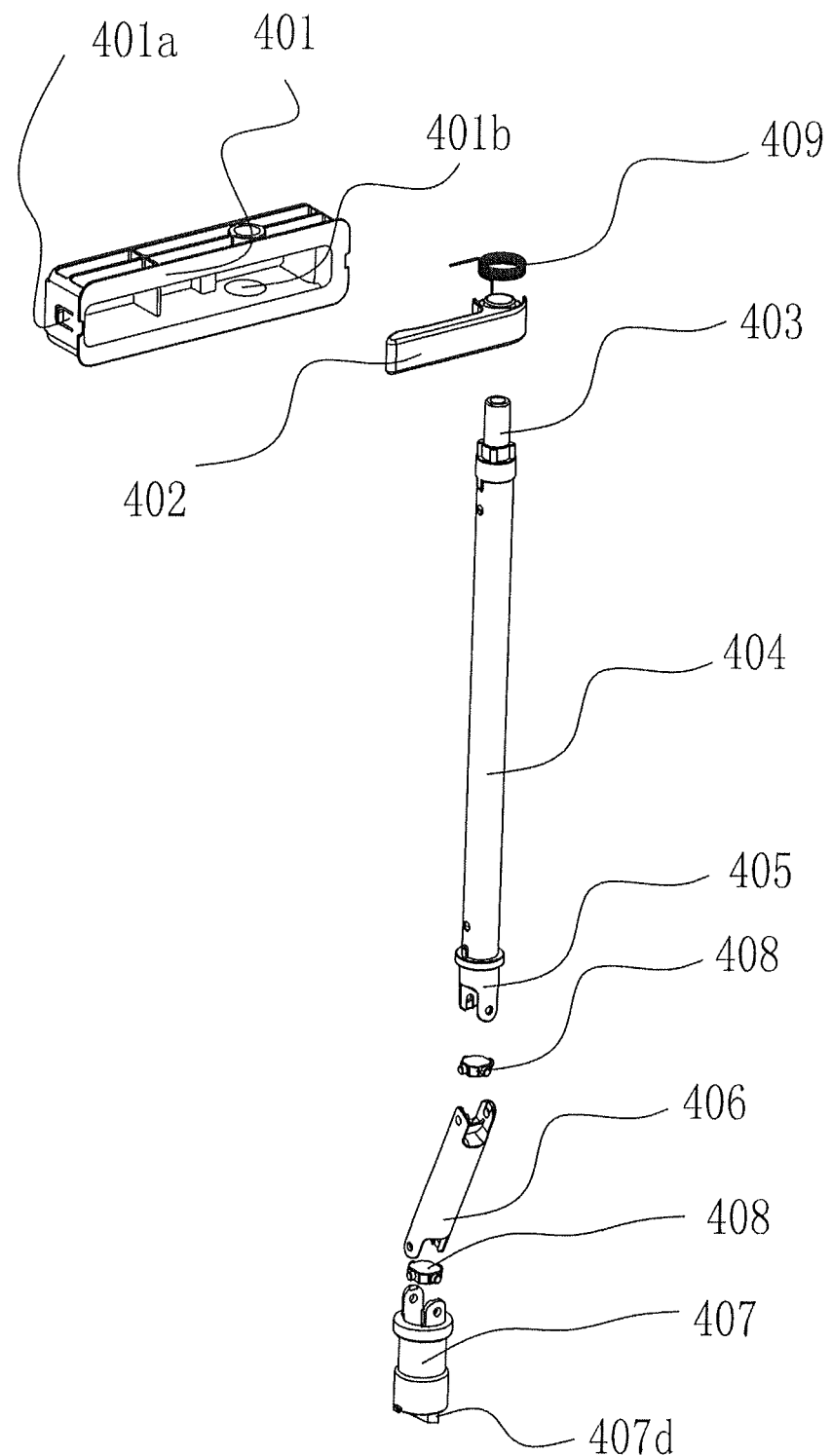
FIG. 3 is an exploded perspective view of the valve opening/closing device in FIG. 2.

FIGS. 2 and 3 illustrate the valve opening/closing device 400 according to the one embodiment of the present invention. As shown in FIGS. 2 and 3, the valve opening/closing device 400 includes a handle fixing base 401, a handle 402, a handle connecting member 403, a connecting tube 404, an upper connecting section 405, a middle connecting section 406, a lower connecting section 407, a cross member 408 and a handle restoring spring 409. The handle 402 is installed in the fixing base 401 and is connected to one end of the handle connecting member 403. The other end of the handle connecting member 403 is connected to one end of the connecting tube 404. The other end of the connecting tube 404 is connected to one end of the middle connecting section 406 through the cross member 408, and the other end of the middle connecting section 406 is connected to one end of the lower connecting section 407 through another cross member 408. The other end of the lower connecting section 407 is provided with a "—"-shaped connecting head 407d. The "—"-shaped connecting head 407d may be engaged with the "—"-shaped connecting slot provided on the valve stem, so as to achieve the opening/closing of the valve, which will be further described hereinafter.

As shown in FIG. 3, a projection 401a and a mounting hole 401b are provided on the handle fixing base 401. The projection 401a is engaged with a groove (not shown) provided on the side plate, so as to keep the fixing base 401 on the side plate 2. It should be noted that the fixing base 401 can be kept on the side plate 2 through other means, such as through threaded connection.

Figure 4:
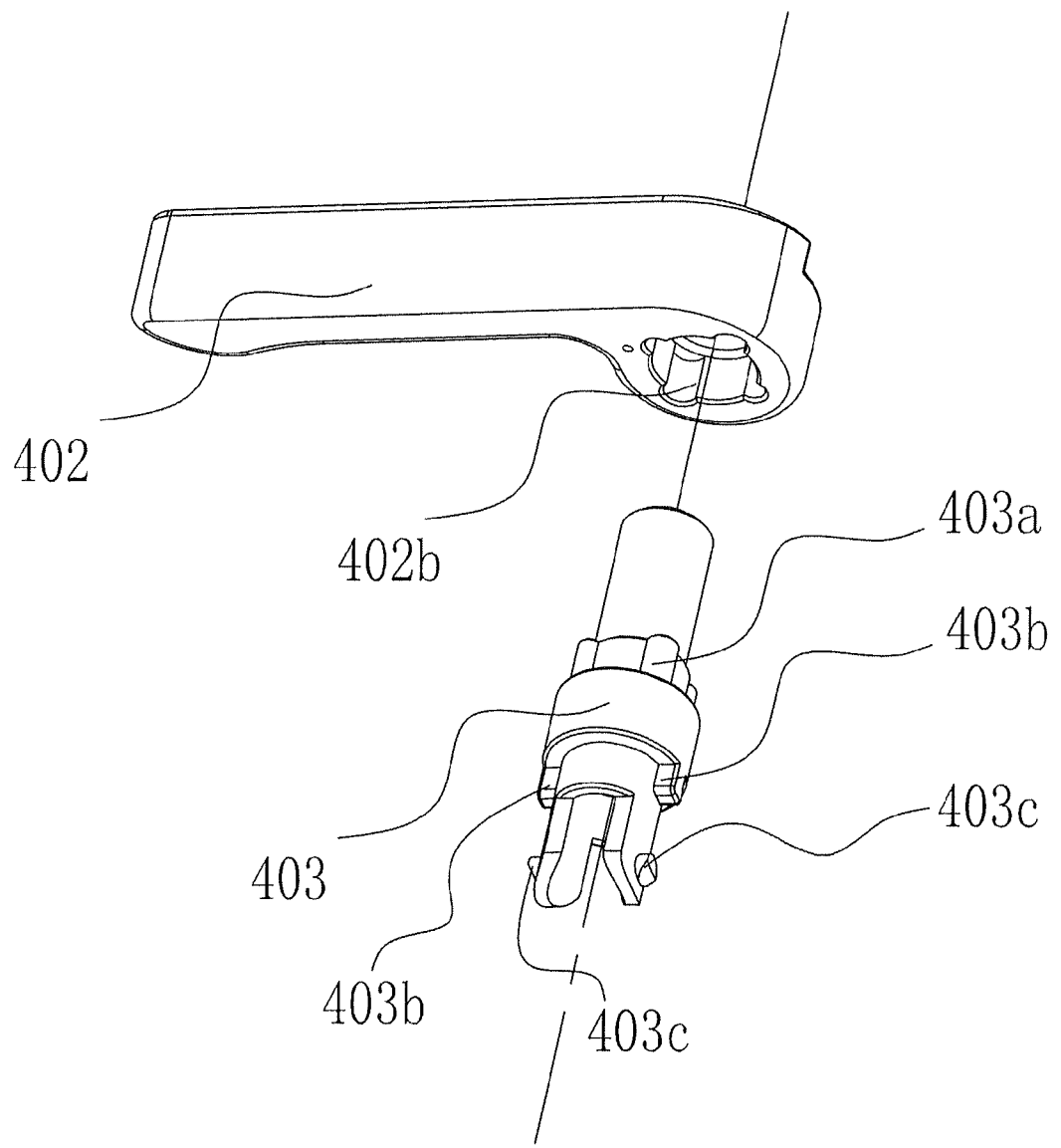
FIG. 4 is a perspective structural view of the handle and the handle connecting member of the valve opening/closing device in FIG. 2.

A handle restoring spring mounting groove and a spline groove 402b are provided at the root of the handle 402. The handle restoring spring 409 can be embedded in the handle 402, and can be mounted into the fixing base 401 together with the handle. As shown in FIG. 4, one end of the handle connecting member 403 is provided with a spline 403a, and the other end of the handle connecting member 403 is provided with a rotation-stopping projection 403b and an elastic button 403c. During installation, one end of the handle connecting member 403 is inserted through the mounting hole 401b of the handle fixing base, and the spline 403a on the connecting member 403 engages with the spline groove 402b on the handle 402, so as to achieve the connection between the handle 402 and the handle connecting member 403.

Figure 5:
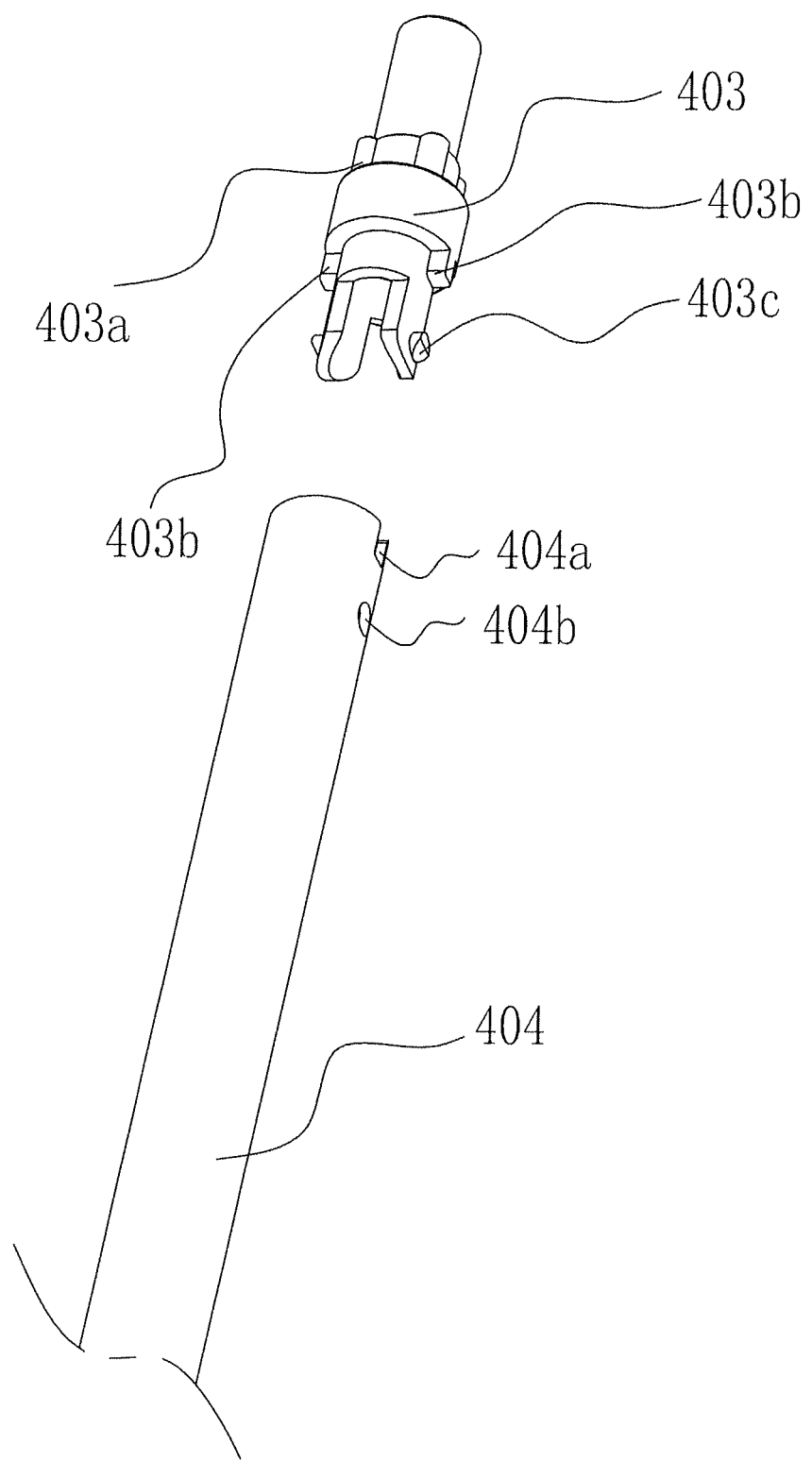
FIG. 5 is a perspective structural view of the handle connecting member and the connecting tube of the valve opening/closing device in FIG. 2.

The rotation-stopping projection 403b and the elastic buttons 403c on the handle connecting member 403 are engaged with the rotation-stopping slot 404a and the positioning hole 404b respectively. That is, the rotation-stopping projection 403b and the elastic button 403c are snapped into the rotation-stopping slot 404a and the positioning hole 404b respectively, so as to achieve the connection between the connecting member 403 and the connecting tube, as shown in FIG. 5.

Figure 6:
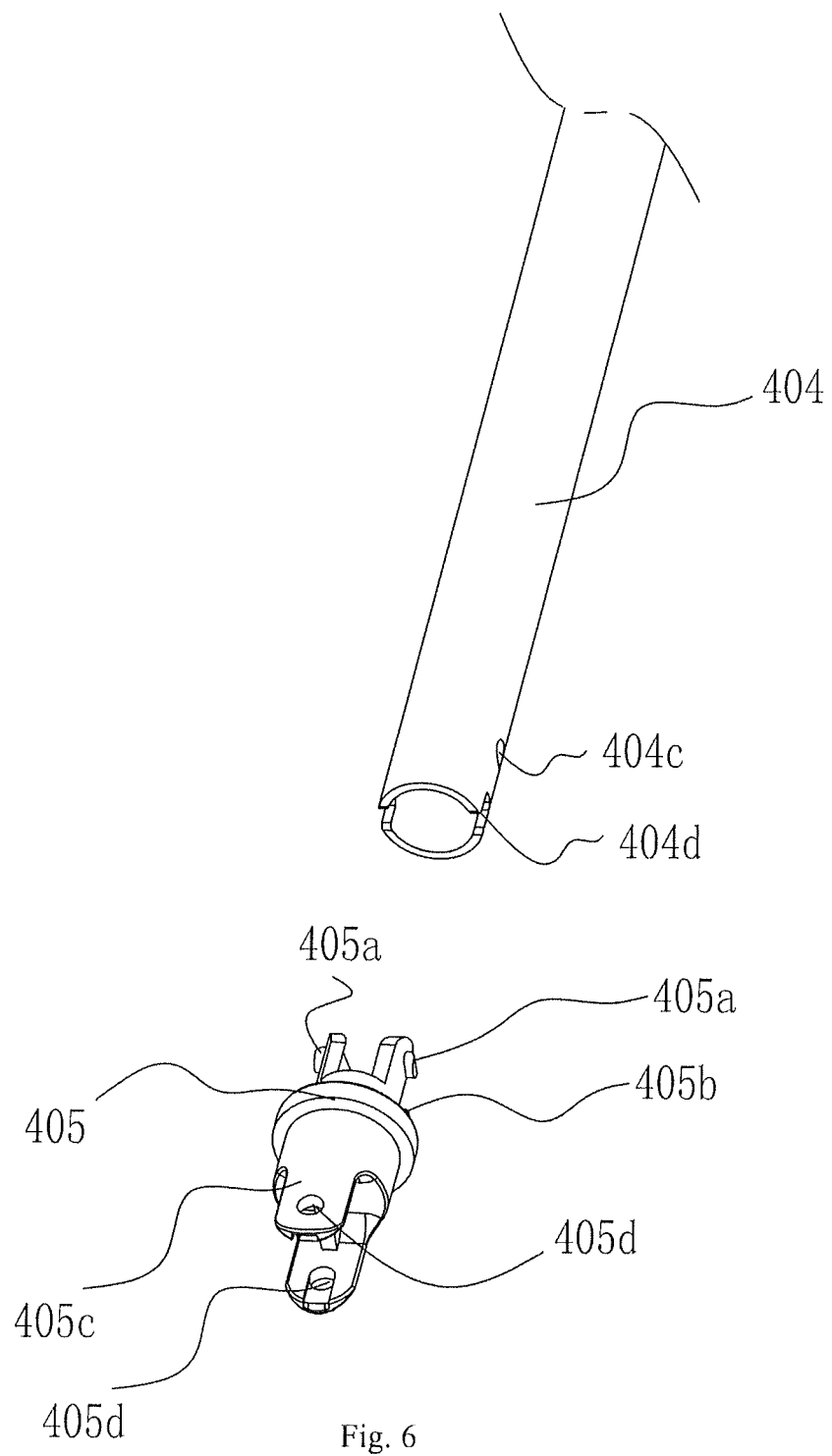
FIG. 6 is a perspective structural view of the connecting tube and the upper connecting section of the valve opening/closing device in FIG. 2.

The other end of the connecting tube 404 is also provided with a positioning hole(s) 404c and a rotation-stopping slot(s) 404d. The positioning hole 404c and the rotation-stopping slot 404d are engaged with the elastic button 405a and the rotation-stopping projection 405b on the other end of the upper connecting section 405 respectively. That is, the elastic button 405a and the rotation-stopping projection 405b on the upper connecting section 405 are snapped into the positioning hole 404c and the rotation-stopping slot 404d respectively, so as to achieve the connection between the connecting tube 404 and the upper connecting section 405, as shown in FIG. 6.

Figure 7:
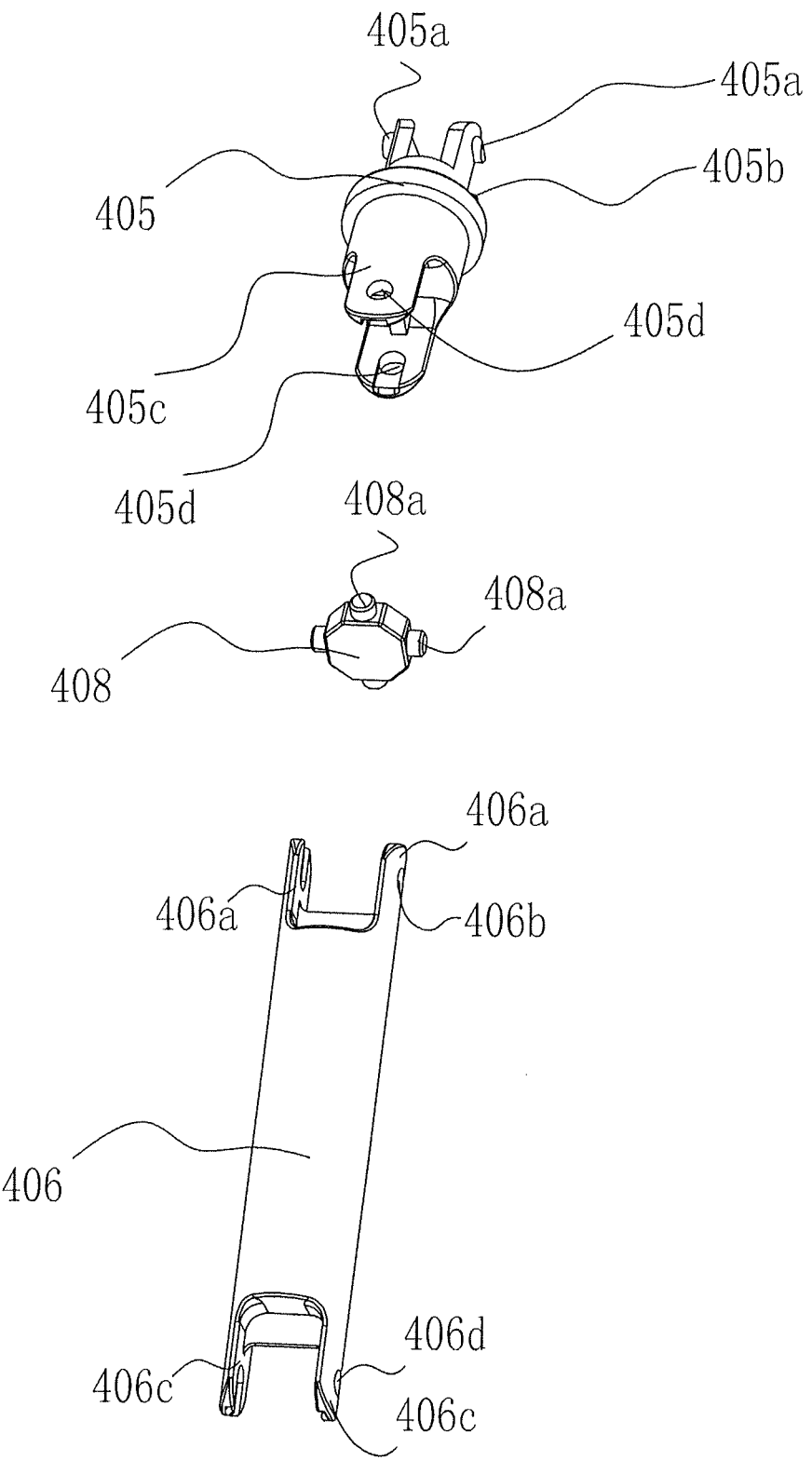
FIG. 7 is a perspective structural view of the upper connecting section, the cross member and the middle connecting section of the valve opening/closing device in FIG. 2.

Connecting lugs 405c which are rigid axially and elastic radially are provided at the other end of the upper connecting section 405. The connecting lugs 405c are provided with connecting holes 405d, as shown in FIGS. 6-7. Also, the middle connecting section 406c are provided with connecting lugs 406a, 406c which are rigid axially and elastic radially at two ends thereof respectively and are also provided with connecting holes 406b, 406d on the connecting lugs 406a, 406c respectively. The upper connecting section 405 and the middle connecting section 406 are connected through the cross member 408. Specifically, as shown in FIG. 7, the cross member 408 is provided with four radially projecting shafts 408a which form a cross. During installation, two opposing shafts are snapped into two respective connecting holes 405d on the upper connecting section 405, while the other two opposing shafts are snapped into two respective connecting holes 406b on the middle connecting section 406, so as to achieve the connection between the upper connecting section 405 and the middle connecting section 406, as shown in FIG. 7.

Figure 8:
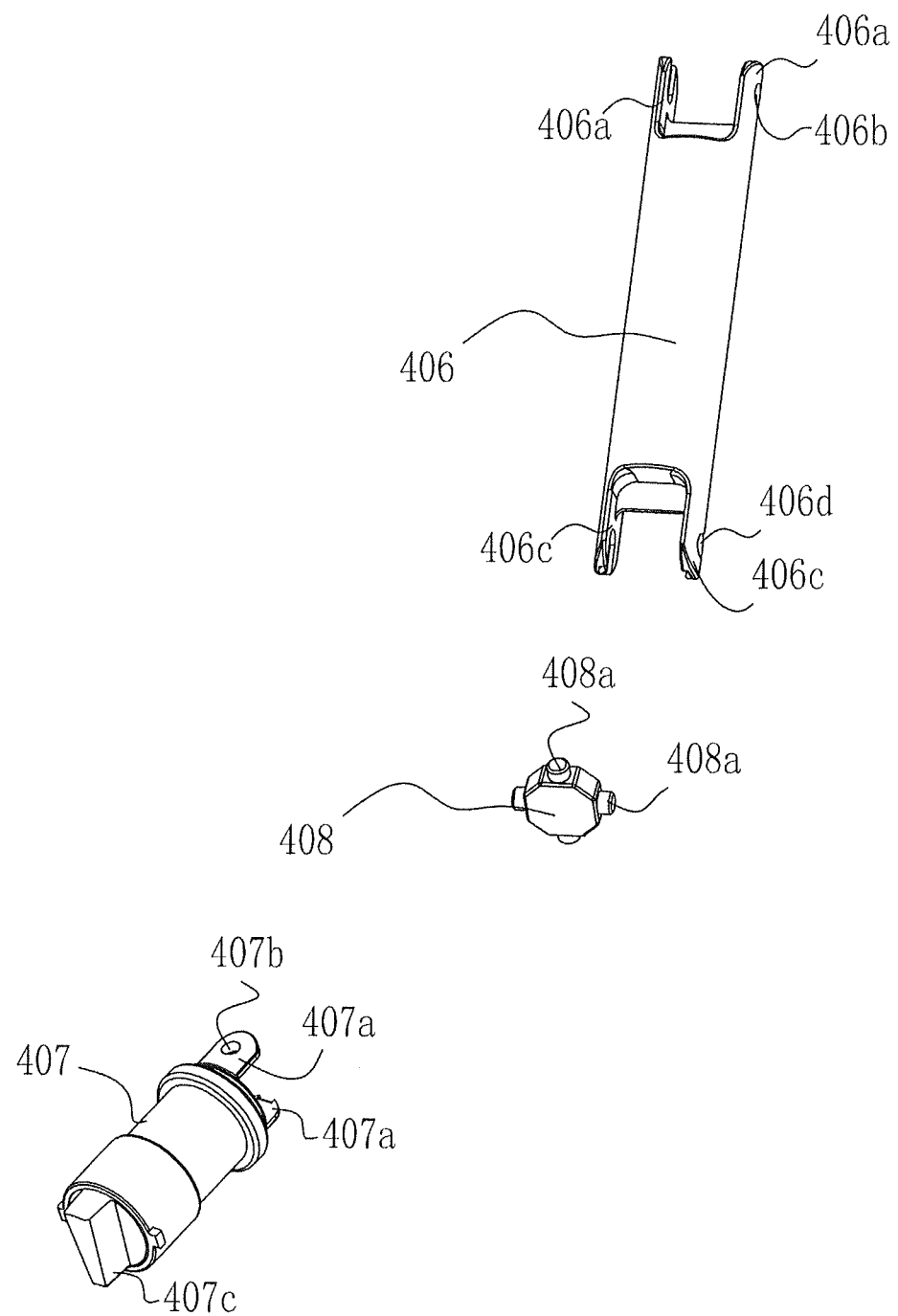
FIG. 8 is a structural perspective view of the middle connecting section, the cross member and the lower connecting section of the valve opening/closing device in FIG. 2.

FIG. 8 illustrates a schematic view of the structure of the lower connecting section 407, and of the connection between the lower connecting section and the middle connecting section 406. As shown in FIG. 8, one end of the lower connecting section 407 is provided with connecting lugs 407a which are rigid axially and elastic radially and connecting holes 407b on the connecting lugs, and the other end thereof is provided with a "—"-shaped connecting head 407c. The middle connecting section 406 is also connected to the lower connecting section 407 through another cross member 408. That is, two opposing shafts of the cross member are snapped into two respective connecting holes 406d of the middle connecting section 406, while the other two opposing shafts are snapped into the two respective connecting holes 407b on one end of the lower connecting section 407, so as to achieve the connection between the middle connecting section 406 and the lower connecting section 407, when installed, the upper connecting section 405, the middle connecting section 406 and the lower connecting section 407 constitute a universal mechanism, so that even if the upper connecting section 405 and the lower connecting section 407 are not in the same axis (i.e. the central rotating axis of the handle and the central rotating axis of the lower connecting section 407 do not coincide), the force acting on the handle can also be transferred through the connecting tube and the lower connecting section, so as to achieve the purpose of opening/closing the valve synchronously, that is, the valve stem is rotated by a same angle (the angle A in FIG. 12) as that of the handle rotated.

Figure 9:
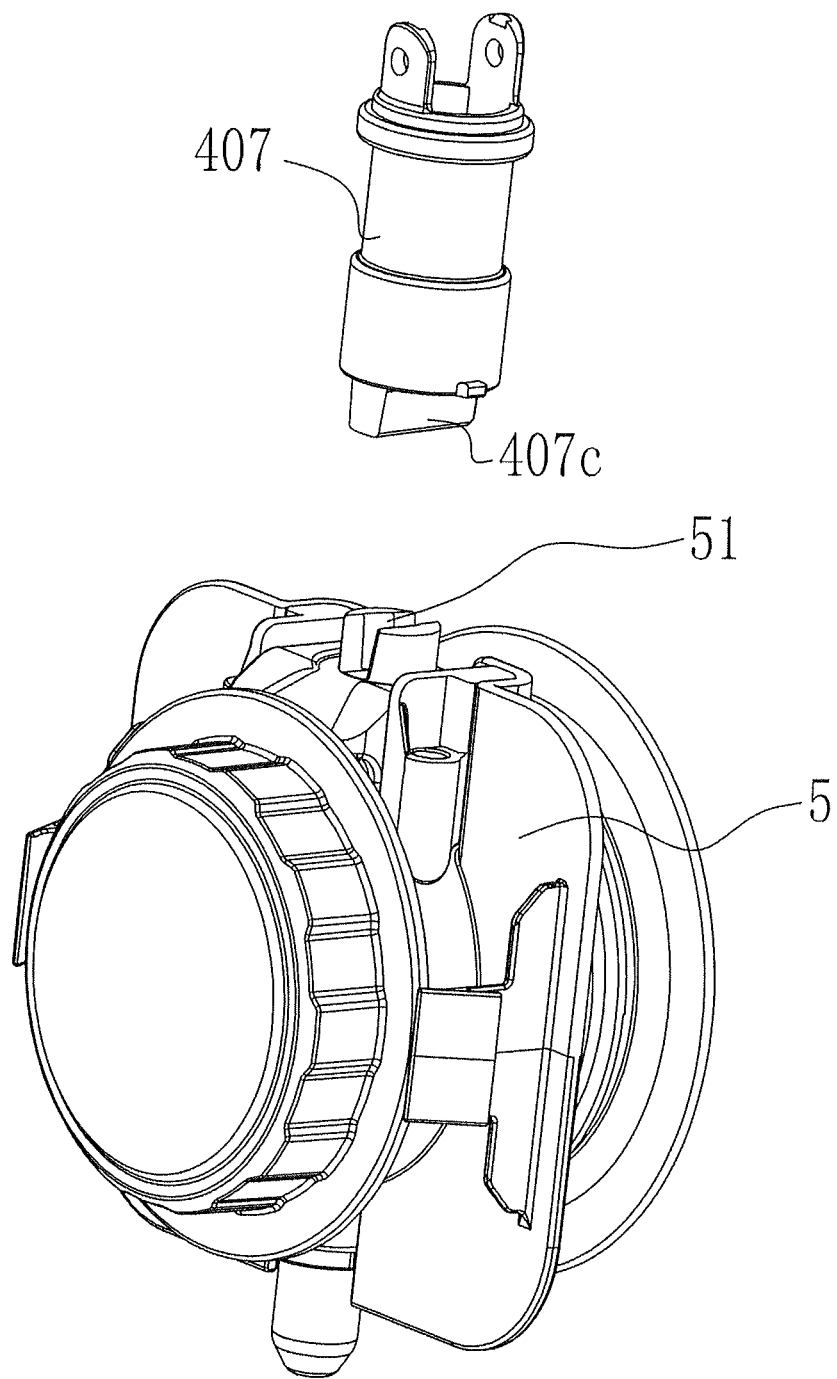
FIG. 9 is a structural perspective view of the lower connecting section of the valve opening/closing device and the valve in FIG. 2.

FIG. 9 shows the connection between the lower connecting section 407 and the valve 5. As shown FIG. 9, the "—"-shaped connecting head on one end of the lower connecting section 407 can be inserted into the "—"-shaped connecting slot on the valve stem 51 of the valve 5. Thus, the rotation of the handle 402 is transferred to the valve stem 51 of the valve through the motion-transferring device constituted by the handle connecting member 403, the connecting tube 404, the upper connecting section 405, the middle connecting section 406, the cross members 408 and the lower connecting section 407, so as to achieve the opening/closing of the valve. In the present embodiment, the valve stem is a valve opening/closing mechanism.

Figure 10:
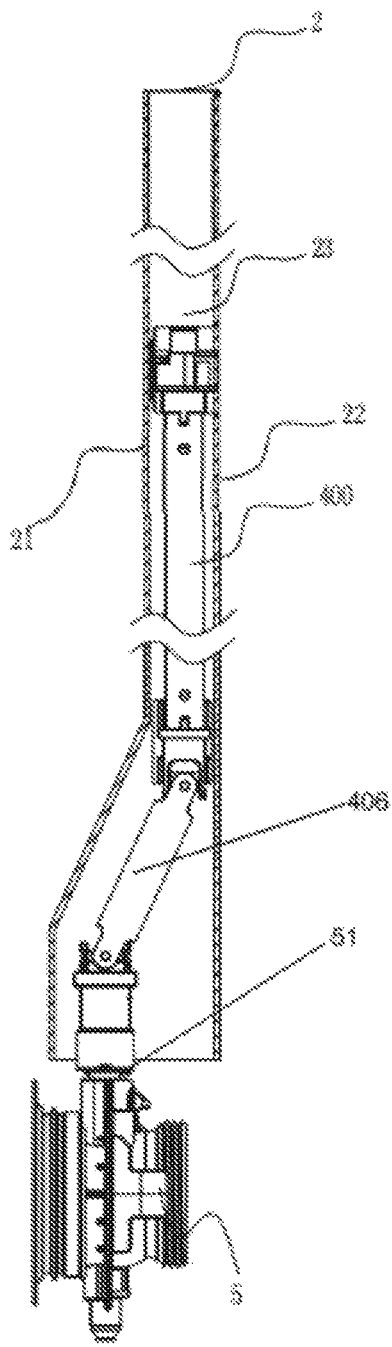
FIG. 10 illustrates a sectional view of the valve opening/closing device when assembled, with only related structures are shown for clarity.

FIG. 10 illustrates a sectional view of the valve opening/closing device when assembled, with only related structures are shown for clarity. As shown in FIG. 10, the whole valve opening/closing device 400 is located in the cavity 23 between two sidewalls 21 and 22 of the side plate 2 of the container, thus the overall volume will not be affected, and the level of folding will not be increased when folding the intermediate bulk container.

Figure 11:
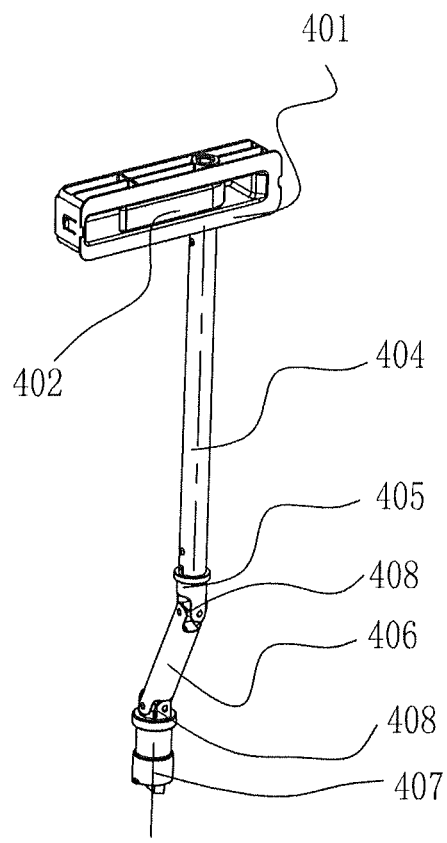
FIGS. 11-12 illustrate perspective structural views of the valve opening/closing device in FIG. 2 in a closed and opened state, respectively.
Figure 12:
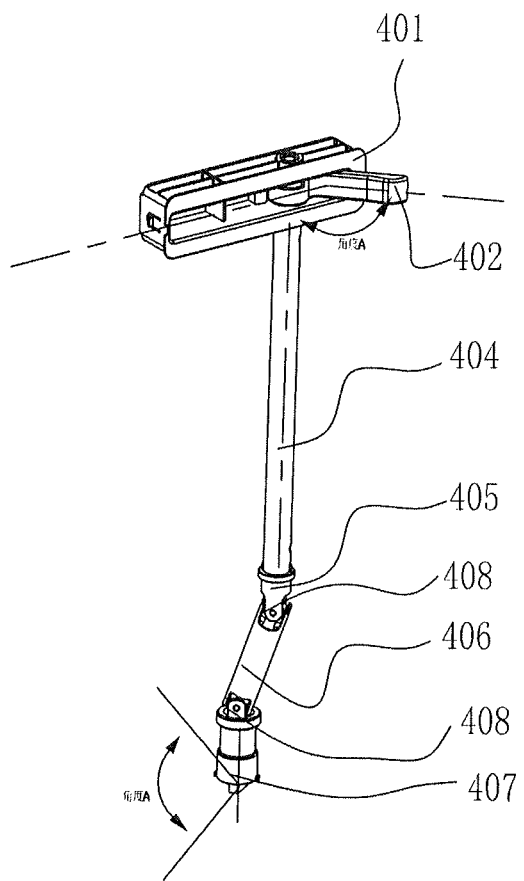

FIGS. 11 and 12 are schematic structural views of the opening/closing device according to the present invention in a closed and opened state respectively. During use, the opening angle of the handle is the same as the rotating angle of the portion connected to the valve (i.e., the "—"-shaped connecting head), that is, the rotating angle of the handle is the same as the rotating angle of the valve core, thereby facilitating the opening/closing of the valve. Further, when the rotational axis center of the handle and the axis center of the valve core are not in a same axis center line, a 1:1 synchrodrive between force and rotating angle may also be obtained through, such as, the universal structure of the middle connecting section according to the embodiments above.

It should be noted that the above embodiments may have various modifications. For example, the position on the side plate where the handle fixing base locates and the sizes of components can be designed as needed. The handle can be designed to have different shapes, sizes and different directions of acting force, such as pulling force, and pressing force and so on. The handle connecting member may take other forms, as long as one end thereof is fixed inside the handle, and can move axially along with the handle, while the other end is fixed with the connecting tube through a positioning structure. Alternatively, the handle connecting member can be formed integrally with the connecting tube.

Moreover, when the rotational axis of the handle and the axis of the valve core are in the same line, the middle connecting section can be omitted, so that the upper connecting section directly engages with the lower connecting section. Alternately, the upper connecting section is omitted, so that the upper connecting section is formed integrally with the connecting tube. Alternately, all the connecting sections and cross members are omitted, so that one end of the connecting tube is directly connected with the handle.

In addition, the cross member can be omitted, and connecting pins are provided respectively at connecting portions among the upper connecting section, the middle connecting section and the lower connecting section to achieve connection between connecting sections. Moreover, connection between the various components may employ any means known to those skilled in the art.

In addition, the "—"-shaped connecting head on the lower connecting section can be changed to other connecting head with different shapes according to the shape of the valve stem, such as "+"-shape, irregular shapes and so on.

Further, the valve opening/closing device according to the present invention may be used in a variety of valves, such as ball valves, butterfly valves and the like.

For the valve opening/closing device according to the present invention, the operating handle is provided at an appropriate position of the side plate of the container, thereby avoiding operations like bending over or squatting on the ground, etc. when opening or closing the valve, facilitating use. Further, the motion-transferring device is installed inside the side plate, thus during the usage of the intermediate bulk container, the overall volume ratio will not be affected, and the level of folding will not be increased when folding the intermediate bulk container. Moreover, the operating handle or lever on the side plate can be made with moment arms of different sizes, different lengths, which makes it easy to control the operating force.

Preferred embodiments of the present invention has been described in detail hereinbefore, but it is to be understood that, after reading the above teachings of the present invention, those skilled in the art may make various modifications or amendments to the present invention. These equivalent forms also fall into the scope limited by appended claims of the present application.

The invention claimed is:

1. An intermediate bulk container, comprising a base, a side plate, and a valve installed at the base of the intermediate bulk container, characterized in that:
   the intermediate bulk container further comprises a valve opening/closing device, wherein the valve/opening closing device comprises a handle, a motion-transferring device, a valve opening/closing mechanism, wherein the valve opening/closing mechanism is a valve stem, and
   the handle is installed on the side plate of the container and is connected to the motion-transferring device, and
   the motion-transferring device is located in a cavity between two sidewalls of the side plate of the container or located in a groove provided on the side plate, so that forces applied on the handle can be transferred to the valve stem through the motion-transferring device so as to achieve opening/closing of the valve located at the base of the container even when a central rotating axis of the handle and the central rotating axis of the valve stem are not along a same longitudinal axis.

2. The intermediate bulk container according to the claim 1, wherein the motion-transferring device comprises a connecting tube connected to the handle, a middle connecting section connected to the connecting tube, and a lower connecting section connected to the middle connection section, wherein the lower connecting section is connected to the valve opening/closing mechanism.

3. The intermediate bulk container according to the claim 1, wherein the valve stem is connected to the motion-transferring device.

4. The intermediate bulk container according to the claim 2, wherein the valve opening/closing device further comprises a handle connecting member, wherein one end of the handle connecting member is provided with a spline, and the other end of the handle connecting member is provided with rotation-stopping projections and elastic buttons; and
   the handle is provided with a spline slot to be engaged with the spline, wherein both ends of the connecting tube are provided with rotation-stopping slots and positioning holes, and the rotation-stopping slots and positioning holes on one end of the connecting tube are engaged with the rotation-stopping projections and elastic buttons respectively.

5. The intermediate bulk container according to the claim 4, wherein
   the valve opening/closing device further comprises an upper connecting section, wherein one end of the upper connecting section is provided with elastic buttons and a rotation-stopping projection, the other end of the upper connecting section is provided with connecting lugs, wherein the connecting lugs are provided with connecting holes; and
   the elastic buttons and the rotation-stopping projection are engaged with the positioning holes and the rotation-stopping slots on one end of the connecting tube respectively.

6. The intermediate bulk container according to the claim 5, wherein
   the valve opening/closing device further comprises a cross member, wherein the cross member is provided with four radially projecting shafts which forms a cross;
   the middle connecting section is also provided with connecting lugs and connecting holes on the connecting lugs, and the upper connecting section is connected to the middle connecting section through the cross member.

7. The intermediate bulk container according to the claim 6, wherein one end of the lower connecting section is provided with lugs and connecting holes, and the middle connecting section is connected to the lower connecting section through another cross member.

8. The intermediate bulk container according to the claim 1, wherein the valve opening/closing device further comprises a handle fixing base used to secure the handle and installed on the side plate of the container.

9. The intermediate bulk container according to the claim 8, wherein the valve opening/closing device further comprises a handle restoring spring, which can be embedded into the handle and installed in the handle fixing base together with the handle.

10. A valve opening/closing device for an intermediate bulk container, wherein the container comprises a base and a side plate, comprising:
    a handle connected to a motion-transferring device; and
    a valve opening/closing mechanism, wherein
    the handle is installed on the side plate of the container and is connected to the motion-transferring device,
    the motion-transferring device is at least partially located in a cavity between two sidewalls of the side plate of the container, and a force applied to the handle can be transferred to the valve opening/closing mechanism through the motion-transferring device so as to achieve opening/closing of a valve located at a base of the container even when a central rotating axis of the handle and the central rotating axis of the valve opening/closing mechanism are not along a same longitudinal axis,
    wherein the motion-transferring device comprises a connecting tube connected to the handle, a middle connecting section connected to the connecting tube, and a lower connecting section connected to the middle connection section, wherein the lower connecting section is connected to the valve opening/closing mechanism,
    the valve opening/closing device further comprises a handle connecting member, wherein one end of the handle connecting member is provided with a spline, and the other end of the handle connecting member is provided with rotation-stopping projections and elastic buttons; and
    the handle is provided with a spline slot to be engaged with the spline, wherein both ends of the connecting tube are provided with rotation-stopping slots and positioning holes, and the rotation-stopping slots and positioning holes on one end of the connecting tube are engaged with the rotation-stopping projections and elastic buttons respectively.

11. The valve opening/closing device according to the claim 10, wherein the valve opening/closing device further comprises an upper connecting section, wherein one end of the upper connecting section is provided with elastic buttons and a rotation-stopping projection, the other end of the upper connecting section is provided with connecting lugs, wherein the connecting lugs are provided with connecting holes; and the elastic buttons and the rotation-stopping projection are engaged with the positioning holes and the rotation-stopping slots on one end of the connecting tube respectively.

12. The valve opening/closing device according to the claim 11, wherein the valve opening/closing device further comprises a cross member, wherein the cross member is provided with four radially projecting shafts which forms a cross;

the middle connecting section is also provided with connecting lugs and connecting holes on the connecting lugs, and the upper connecting section is connected to the middle connecting section through the cross member.

13. The valve opening/closing device according to the claim 12, wherein one end of the lower connecting section is provided with lugs and connecting holes, and the middle connecting section is connected to the lower connecting section through another cross member.

* * * * *